Aug. 7, 1928.

C. T. BRADSHAW 1,679,957

ELECTRIC MOTOR

Filed Dec. 17, 1924

INVENTOR:
Charles T. Bradshaw
BY
ATTORNEY

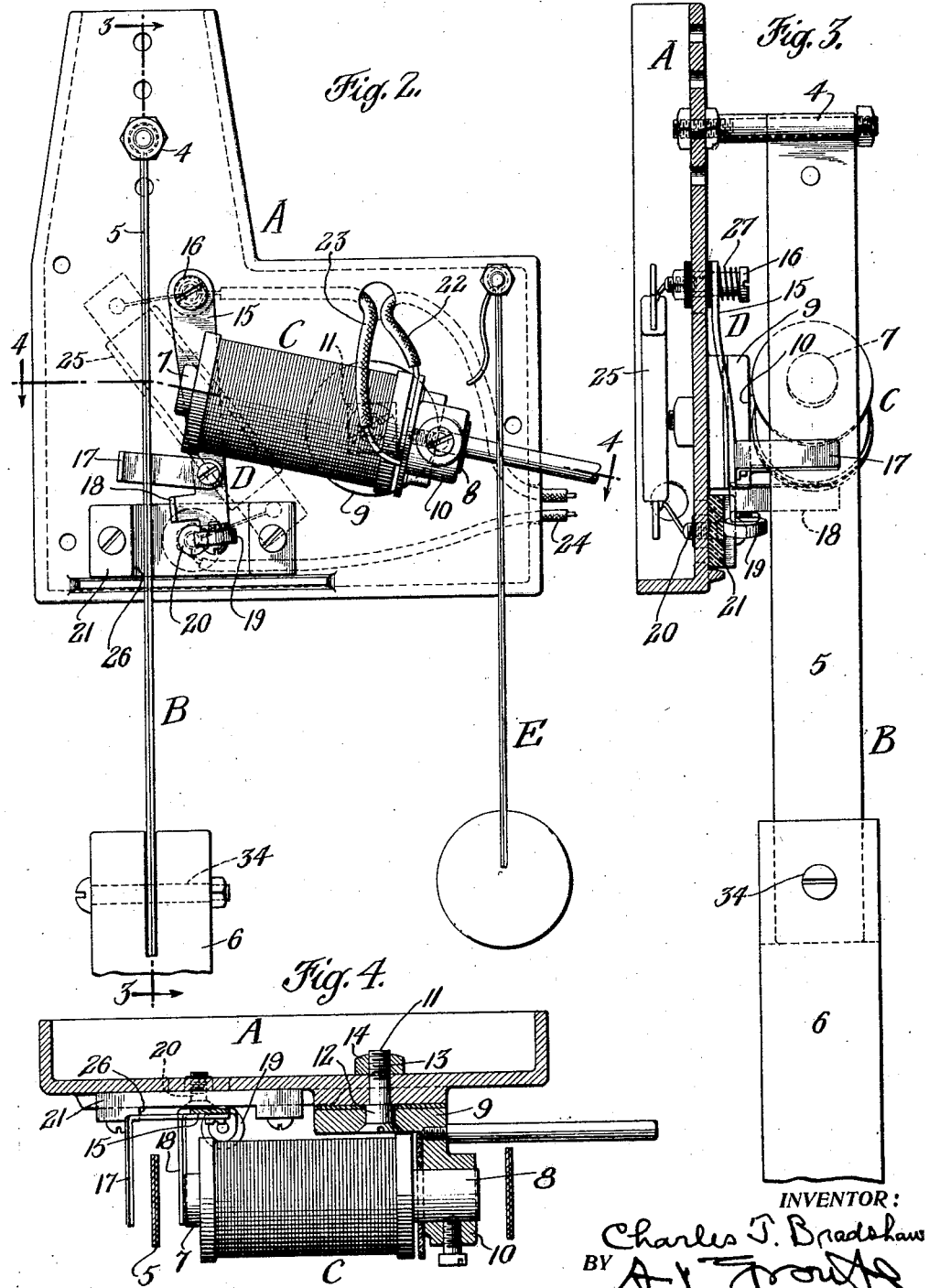

Patented Aug. 7, 1928.

1,679,957

UNITED STATES PATENT OFFICE.

CHARLES T. BRADSHAW, OF PHILADELPHIA, PENNSYLVANIA, ASSIGNOR TO EUGENE CARRAINE, OF PHILADELPHIA, PENNSYLVANIA.

ELECTRIC MOTOR.

Application filed December 17, 1924. Serial No. 756,451.

This invention relates to electric motors and has for one of its primary objects the provision of a motor of novel construction having an oscillating power transmitting member adapted to be actuated by an electrical device under control of said member.

I aim to provide a motor which is simple in construction, inexpensive to manufacture, and the parts of which are arranged so as to be readily accessible for replacement. A further aim is to provide a magnetically operated pendulum motor in which the electromagnet may be quickly adjusted to give speed changes and to set the device in position for use with either A. C. or D. C. current.

A still further aim is the provision of a motor of the foregoing character in which the electric circuit is opened when the power transmitting member assumes its normal or rest position.

With the foregoing and related objects in view, my invention consists of the elements and the combination of them hereinafter described and claimed.

In the accompanying drawings, illustrating the invention.

Figure 2 is an enlarged face view of the motor.

Figure 3 is a section taken on the line 3—3 of Fig. 2.

Figure 4 is a section taken on the line 4—4 of Fig. 2.

Figure 1:
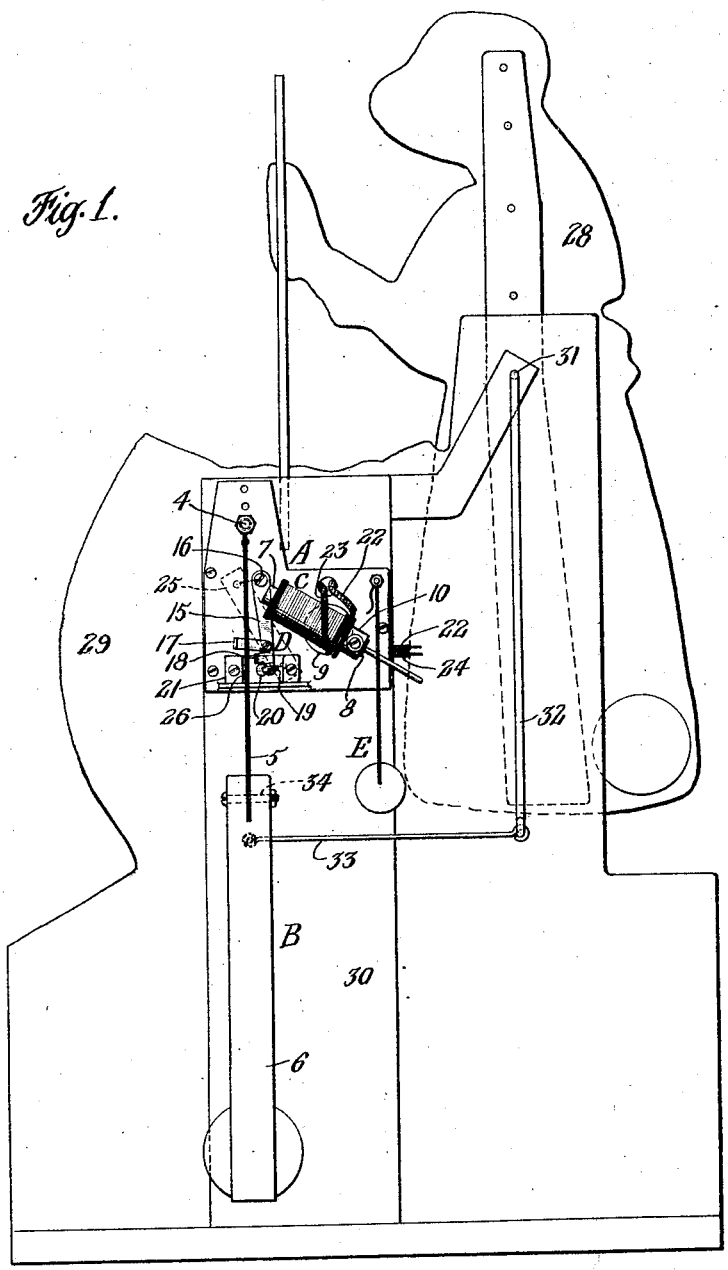
Figure 1 is a face view of my improved motor shown applied to the rear structure of an advertising display service.

Referring now more particularly to Figs. 2, 3 and 4, it will be seen that in this instance the motor in general is composed of a frame or support A of any suitable size and shape for the purpose intended, a pendulum B, an electromagnet C and a control mechanism D.

The pendulum B is mounted on the support A at 4 in any convenient manner and in this instance consists of a resilient metallic member 5 and a weighted extension member 6. The metallic member 5 of the pendulum serves as the armature for the electromagnet, it being disposed in proper relation to the electro-magnet so that when the magnet is energized it will attract the armature portion of the pendulum.

The electro-magnet is of usual construction, its core 7, however, extending a sufficient distance from the spool at 8 to provide a convenient means for mounting the magnet on a movable support 9 now to be described.

The movable support 9 is in the form of a bracket 10 and is pivotally mounted on the main support A by means of the pivot pin 11, said pin having a shouldered portion 12 on which the bracket 10 pivots and a screw threaded portion 13 for receiving the nut 14, by means of which the pivot pin 11 is secured to the support A.

As thus far described it will be seen that when the electro-magnet C is energized, the pendulum B will be attracted by virtue of its armature portion and when de-energized the pendulum will swing in the opposite direction. Thus, by supplying and cutting off the current in alternate succession, a continued swinging movement is imparted to the pendulum from which power is taken off.

An important feature of this invention resides in the manner in which I automatically control the current to bring about the above results, through the medium of the control device D. This device is here shown as composed of an arm 15 pivotally mounted on the support A at 16, having a pair of adjustable abutments 17 and 18 between which the pendulum B passes. The free end of the arm 15 carries a contact, in this instance shown as a roller contact 19; it being understood, however, that any other suitable form of contact might be used. The movable roller contact 19 co-operates with a fixed contact 20 carried by the insulating member 21 which, in turn, is secured to the support A. It is here pointed out that the pivoted arm 15, the fixed contact 20 and the pendulum are all mounted in such relation to one another so that as the pendulum assumes its normal or rest position the contacts are in position to open the circuit to be hereinafter described.

Referring now more especially to Fig. 2, it will be seen that a wire 22 from the source of electric current is connected to one end of the coil of the electro-magnet and that the other end of the coil is connected by the wire 23 to the pivot pin 16 of the controlling device arm, which pin 16 is insulated from the support A. A wire 24 is connected to the fixed contact 20 and leads to the source of electric current. Thus it will be seen when the contacts are in closed position that the current passes through the wire 22, the coil of the electro-magnet C, wire 23, arm 15, roller contact 19, fixed contact 20 and wire 24 completing the circuit. In order to minimize the spark caused by the making and breaking of the contacts I have connected a shunt 25 of any suitable type across the contacts.

Assuming the pendulum to be at its rest position and that it is desired to start the device in operation, it is only necessary to rock the pendulum slightly. This rocks the pivoted arm 15 by striking first one of its abutments 17 and 18 and then the other, thereby causing the movable contact 19 to make with the fixed contact 20 closing the circuit. As viewed in Fig. 2, the contacts make as the pendulum swings to the left thus energizing the magnet to pull the pendulum to the right which in its course strikes the abutment 18 and breaks the circuit. The time at which the contacts make and break can be altered by adjusting the abutments 17 and 18. The pendulum upon striking the core of the armature is given a sharp rebound, by virtue of the resiliency of its member 5 again closing the circuit and so on, until either the current is cut off or the pendulum forcibly stopped. In other words, the pendulum is yieldingly arrested in its movement which avoids undue strains on the mechanism and at the same time serves to give momentum thereto for its return movement. A similar rebound is effected as the pendulum swings to the left by its engagement with the abutment 17 of the arm which is limited in movement by its engagement with the shoulder 26 of the member 21.

If desired, the speed of the motor can be altered by adjusting the electro-magnet by means of the pivoted bracket hereinbefore described toward or from the armature portion 5 of the pendulum. When adjustment is made for slow speed the gap between the electro-magnet and pendulum is increased and the abutments 17 and 18 then serve to arrest the movement of the pendulum. By thus altering the operative relation of the pendulum and the electro-magnet I am enabled to operate my device either with alternating or direct current, setting the magnet in close relation to the pendulum for alternating current and increasing the gap for direct current.

Referring now to Figs. 2 and 3, it will be seen that tension is applied to the contact roller 19 and to the arm 15 by means of the tension spring 27. This makes for effective contact between the roller and fixed contact and also serves to frictionally hold the arm in its normal position which it assumes when the pendulum comes to rest. If desired, the arm 15 may be made of any suitable spring material to accomplish the aforesaid result.

While I have described my motor as having a single pendulum, it is to be understood that a second pendulum E having an armature portion may be employed, at the opposite end of the core 7. It is to be noted that the pendulums will have opposite movements, that is to say, when the magnet is energized pendulum C swings to the right and pendulum E swings to the left.

Reverting now to Fig. 1, I have shown therein an advertising display device in rear view with my improved motor applied thereto. The display represents a maid 28 churning butter in a cocoanut shell 29 which is secured to any suitable form of framework 30 for holding it in an upright position. The member representing the maid is pivoted at 31 to the framework 30, said pivot having an extending arm 32 connected to the pendulum B by means of a link 33. By so connecting the motor to the display device it will be seen that the effect of a maid churning butter is produced. If desired, similar connections may be made to the pendulum E for operating other conveniently located members. It is to be noted that the extension member 6 of the pendulum is pivotally connected, at 34, to the armature portion 5 of the pendulum to avoid binding of the pendulum.

While I have described the motor as operating a display device, it is to be understood that I do not limit the use of my invention to such, it being clear that it may be advantageously used for many other purposes.

I claim:—

1. In an electric motor, the combination of a support, an electro-magnet carried thereby, a pendulum mounted on the support and having an armature adjacent to said electro-magnet, a member pivoted on the support and provided with an electrical contact part and two spaced abutments between which the pendulum extends, a fixed contact part, and means to include the electro-magnet and said contact parts in an electric circuit which may be opened and closed by said contact parts, the pendulum and the abutments being constructed to move the contact part carried by the member into engagement with the fixed contact part when the pendulum swings from the electro-magnet and out of engagement with the fixed contact part when the pendulum swings toward the electro-magnet and said pendulum being movable wholly by gravity when it swings from the electro-magnet.

2. In an electric motor, the combination of a support, an electro-magnet carried thereby, a pendulum mounted on the support and having an armature adjacent to said electro-magnet, a member movable on the support and provided with an electrical contact part and two spaced abutments between which the pendulum extends, a fixed contact part, means to include the electro-magnet and said contact parts in an electric circuit which may be opened and closed by said contact parts, the pendulum and the abutments being constructed to move the contact part carried by the member into engagement with the fixed contact part when the pendulum swings from the electro-magnet and out of engagement with the fixed contact part when the pendulum swings toward the electro-magnet, and means operable to vary the distance between the electro-magnet and the armature of the pendulum.

3. In an electric motor, the combination of a support, a pair of movable power transmitting members mounted on the support each having an armature portion, an electric circuit including an electro-magnet mounted on the support between said members and adjacent to the armature portions thereof for actuating them when the circuit is opened and closed in alternate succession, said circuit including means operated by one of the movable members for automatically opening and closing the same.

4. In an electric motor, the combination of a support, a pair of pendulums mounted on the support and each having an armature portion, an electric circuit including an electro-magnet mounted on the support between said pendulums and adjacent to the armature portions thereof for actuating them, said circuit including means operated by one of the pendulums for automatically opening and closing the same.

5. In an electric motor, the combination of a support, an electro-magnet carried thereby, a pendulum mounted on the support and having an armature adjacent to said electro-magnet, a spring pressed member pivoted on the support and provided with an electrical contact roller pressed toward said contact part and two spaced abutments between which the pendulum extends, and means to include the electro-magnet and said contact part and said roller in an electric circuit which may be opened and closed by said part and said roller, the pendulum and the abutments being constructed to move the contact roller into engagement with the fixed contact part when the pendulum swings from the electro-magnet and out of engagement with the fixed contact part when the pendulum swings toward the electro-magnet, and said roller being pressed by said member against said part.

6. In an electric motor, the combination of a support, an electric circuit including an electro-magnet mounted on the support, a pendulum on the support and constructed to swing from side to side of a normal hanging position and having an armature adjacent to the electro-magnet, said circuit including a contact part fixed on the support, a member movable on the support and having a contact part and means adapted to be engaged by the pendulum at each side of its normal position to move the contact part of the movable member into and from contact with the fixed contact part, said means being so disposed with relation to the pendulum that as the pendulum approaches and assumes said normal position the circuit will be thereby opened.

In testimony whereof I affix my signature hereto.

CHARLES T. BRADSHAW.